(12) United States Patent
Puskas

(10) Patent No.: US 10,415,222 B2
(45) Date of Patent: Sep. 17, 2019

(54) HYGIENIC TOILET WITH WASHING AND DRYING MEANS

(71) Applicant: Gabor Puskas, Ossining, NY (US)

(72) Inventor: Gabor Puskas, Ossining, NY (US)

( * ) Notice: Subject to any disclaimer, the term of this patent is extended or adjusted under 35 U.S.C. 154(b) by 0 days.

(21) Appl. No.: 15/540,871

(22) PCT Filed: Sep. 9, 2016

(86) PCT No.: PCT/US2016/051104
§ 371 (c)(1),
(2) Date: Jun. 29, 2017

(87) PCT Pub. No.: WO2017/044846
PCT Pub. Date: Mar. 16, 2017

(65) Prior Publication Data
US 2018/0023276 A1    Jan. 25, 2018

Related U.S. Application Data

(60) Provisional application No. 62/216,262, filed on Sep. 9, 2015.

(51) Int. Cl.
| | |
|---|---|
| *E03D 9/08* | (2006.01) |
| *A47K 3/26* | (2006.01) |
| *E03D 11/02* | (2006.01) |
| *A47K 13/24* | (2006.01) |
| *A47K 10/48* | (2006.01) |
| *A47K 13/30* | (2006.01) |

(Continued)

(52) U.S. Cl.
CPC .................. *E03D 9/08* (2013.01); *A47K 3/26* (2013.01); *A47K 10/48* (2013.01); *A47K 13/24* (2013.01); *A47K 13/307* (2013.01); *B05B 1/06* (2013.01); *E03D 11/02* (2013.01); *E03D 11/13* (2013.01); *G01B 11/14* (2013.01); *E03D 5/092* (2013.01)

(58) Field of Classification Search
CPC .. E03D 9/08; A47K 13/24; A47K 3/26; A47K 10/48
See application file for complete search history.

(56) References Cited

U.S. PATENT DOCUMENTS 2,696,619 A * 12/1954 Ring ........................ E03D 9/052
4/217
4,422,189 A * 12/1983 Couvrette ................. E03D 9/08
4/420.2

(Continued)

*Primary Examiner* — Janie M Loeppke
(74) *Attorney, Agent, or Firm* — Hoffmann and Baron, LLP

(57) ABSTRACT

The present invention relates to a hygienic toilet comprising a source of hot and cold water; a thermostatic valve in fluid communication with the source of hot and cold water and having a single output to deliver water at a predetermined temperature; a manifold having an input for receiving the water output from the thermostatic valve, the manifold comprising a first water outlet controlled by a proportional control valve and a second water outlet; a washing nozzle in fluid communication with the first water outlet, and having a proportional control valve associated therewith to control the flow of water output from the washing nozzle; and a cleaning nozzle in fluid communication with the second water outlet for providing a water curtain within an interior of the toilet; wherein the water curtain flows over the washing nozzle.

19 Claims, 14 Drawing Sheets

(51) Int. Cl.
*B05B 1/06* (2006.01)
*E03D 11/13* (2006.01)
*G01B 11/14* (2006.01)
*E03D 5/092* (2006.01)

(56) References Cited

U.S. PATENT DOCUMENTS

| | | | |
|---|---|---|---|
| 4,980,933 A * | 1/1991 | Tsutsui | E03D 9/08 |
| | | | 4/420.2 |
| 7,055,185 B1 * | 6/2006 | Deveer | E03D 9/08 |
| | | | 4/420.4 |
| 7,500,275 B2 * | 3/2009 | Kim | E03D 9/08 |
| | | | 4/420.2 |
| 2005/0246828 A1 * | 11/2005 | Shirai | E03D 9/08 |
| | | | 4/420.4 |

* cited by examiner

HYGIENIC TOILET WITH WASHING AND DRYING MEANS

This application is a U.S. National Phase of, and Applicants claim priority from, International Application No. PCT/US2016/51104, filed Sep. 9, 2016, and U.S. Provisional Application No. 62/216,262, filed Sep. 9, 2015, each of which is incorporated herein by reference in its entirety.

The field of the invention is a toilet and more particularly, a hygienic toilet having a washing feature and a means for drying subsequent to washing to allow for hands-free cleansing.

BACKGROUND OF THE INVENTION

A bidet is a plumbing fixture or type of sink intended for washing the "private parts" of the human body in order to cleanse after toilet use. Some bidets resemble a large hand basin, with taps and a stopper so they can be filled up; other designs have a nozzle that squirts a jet of water to aid in cleansing. Bidets are commonly provided as a separate fixture next to a conventional toilet. However, most bathrooms are not large enough to provide the space needed for separate fixtures.

Combination toilets and bidets have been devised, but have not been widely accepted for various reasons. For example, some are retrofit kits which are adapted to be mounted to an existing toilet. These retrofit bidets are typically difficult to mount and give the toilet an awkward appearance. Other combination toilet and bidets have been devised as shown in U.S. Pat. No. 7,493,664. However, this combination has a large opening from which water can escape making use of the bidet feature messy.

Further, such toilet/bidet combinations are not intended to replace the use of toilet paper since some manual wiping is necessary to achieve adequate cleanliness and drying.

A combination toilet/bidet which also purports to dry the user is manufactured in Japan. However, it has been reported that such models do not provide adequate washing and/or drying. Moreover, such models spray from back to front thereby promoting yeast infections in women.

There is a need in the art for an effective and convenient manner by which to cleanse and dry oneself after toilet.

SUMMARY OF THE INVENTION

The present invention is a hygienic toilet which includes a source of hot and cold water, a thermostatic valve in fluid communication with the source of hot and cold water and having a single output to deliver water at a predetermined temperature, a manifold having an input for receiving the water output from the thermostatic valve, the manifold comprising a first water outlet controlled by a proportional control valve and a second water outlet, a washing nozzle in fluid communication with the first water outlet, and having a proportional control valve associated therewith, a cleaning nozzle in fluid communication with the second water outlet for providing a water curtain within an interior of the toilet; wherein the water curtain flows over the washing nozzle, and wherein the cleaning nozzle extends through a front wall on the interior of a bowl portion of the toilet.

The hygienic toilet also includes a drying means for drying water on a user. The drying means includes a means for generating and blowing heated air through a tube to an inlet provided at a rear portion of the toilet, the inlet being in fluid communication with a plurality of vent openings provided within the bowl portion of the toilet. The plurality of vents is preferably first and second vents arranged at opposed side portions within the bowl portion such that air expelled through the first and second vents collide to provide an upward air flow directed out of the bowl portion of the toilet, and, optionally, a third vent located at a rear end of the bowl portion. In a preferred embodiment, the first, second and third vents each comprise an elongated rectangular vent opening.

The hygienic toilet formed in accordance with the present invention preferably further includes a proximity sensing control valve positioned between the thermostatic valve and the manifold. The proximity sensing control valve includes a proximity sensor mounted on a rear portion of the toilet to sense the position of a lid being in an open or closed position. When the lid is in the open position, the proximity sensing control valve opens to allow water to flow to the manifold. Preferably, the proximity sensor is an infrared sensor and the proximity sensing control valve is battery operated. In a preferred embodiment, the cleaning nozzle provides a spray of water at between about 5 psi to about 50 psi, typically about 35 psi, through adjustment of the proportional control valve.

The hygienic toilet of the present invention preferably includes a base, wherein the upper portion of the base comprises the toilet seat, the toilet seat including a contour means for providing a water-tight seal between a user and the toilet seat. The contour means may be a substantially circular or elliptical shaped opening and a front portion having an upwardly extending horn-shaped member having curved contoured sides which transition into the toilet seat upper surface. The horn-shaped member engages the user above the genitals and around the groin area to prevent water from exiting the bowl portion when using the washing nozzle water spray.

In a preferred embodiment, the hygienic toilet further includes drying means for drying water on a user. Similar with respect to the washing feature, the horn-shaped member engages the user to prevent the drying air from exiting the bowl portion. The drying means includes at least one vent to allow drying air to escape the bowl-portion when using the drying means to inhibit overheating. Preferably, the vent associated with drying is a flapper valve which is located in the horn-shaped member.

The hygienic toilet of the present invention preferably includes a tank for holding clean flushing water. The toilet includes a rim having flushing openings under the rim and wherein upon flushing the toilet, flushing water flows through both the flushing openings and the drying vents thereby keeping the drying vents clean from debris. In a preferred embodiment, the source of water for the cleaning nozzle and washing nozzle is a tap into a hot and cold water source for a sink. The preferred predetermined temperature for the cleaning and washing functions is between about 25° C. and 40° C.

BRIEF DESCRIPTION OF THE DRAWINGS

The invention will now be described in greater detail with the aid of the attached drawings, wherein.

DETAILED DESCRIPTION OF THE INVENTION

The hygienic toilet formed in accordance with the present invention includes both a means for washing as well as a means for drying subsequent to washing and allows for hands-free cleansing. Furthermore, the hygienic toilet is designed to incorporate features which keep the various spray heads and vents clean from any debris. The hygienic toilet of the present invention includes standard toilet features such as a tank for holding flushing water and a handle to effect flushing via standard flushing openings provided under a rim of the toilet bowl.

Figure 1:
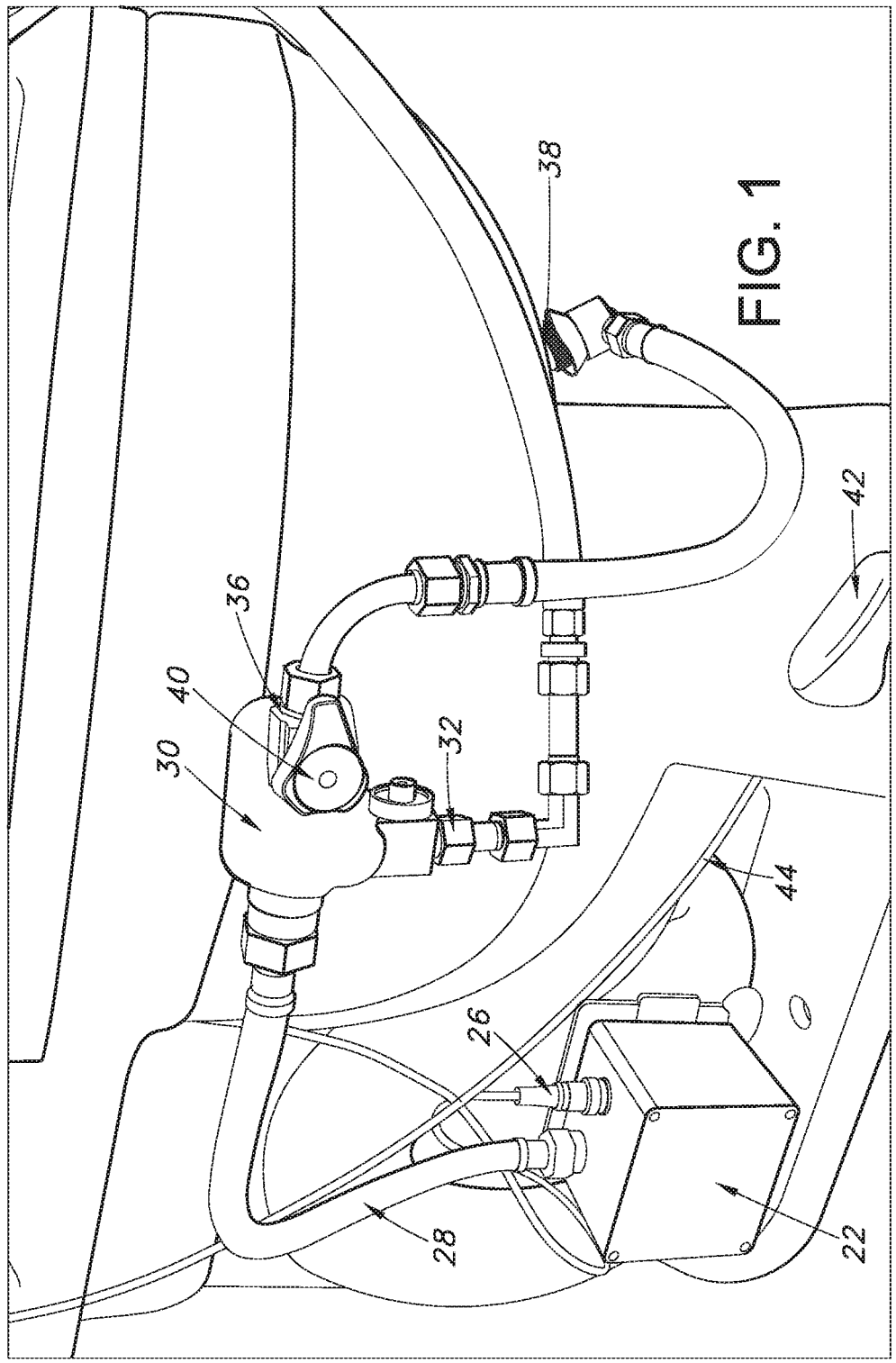
FIG. 1 is a side view of the hygienic toilet formed in accordance with the present invention.
Figure 2:
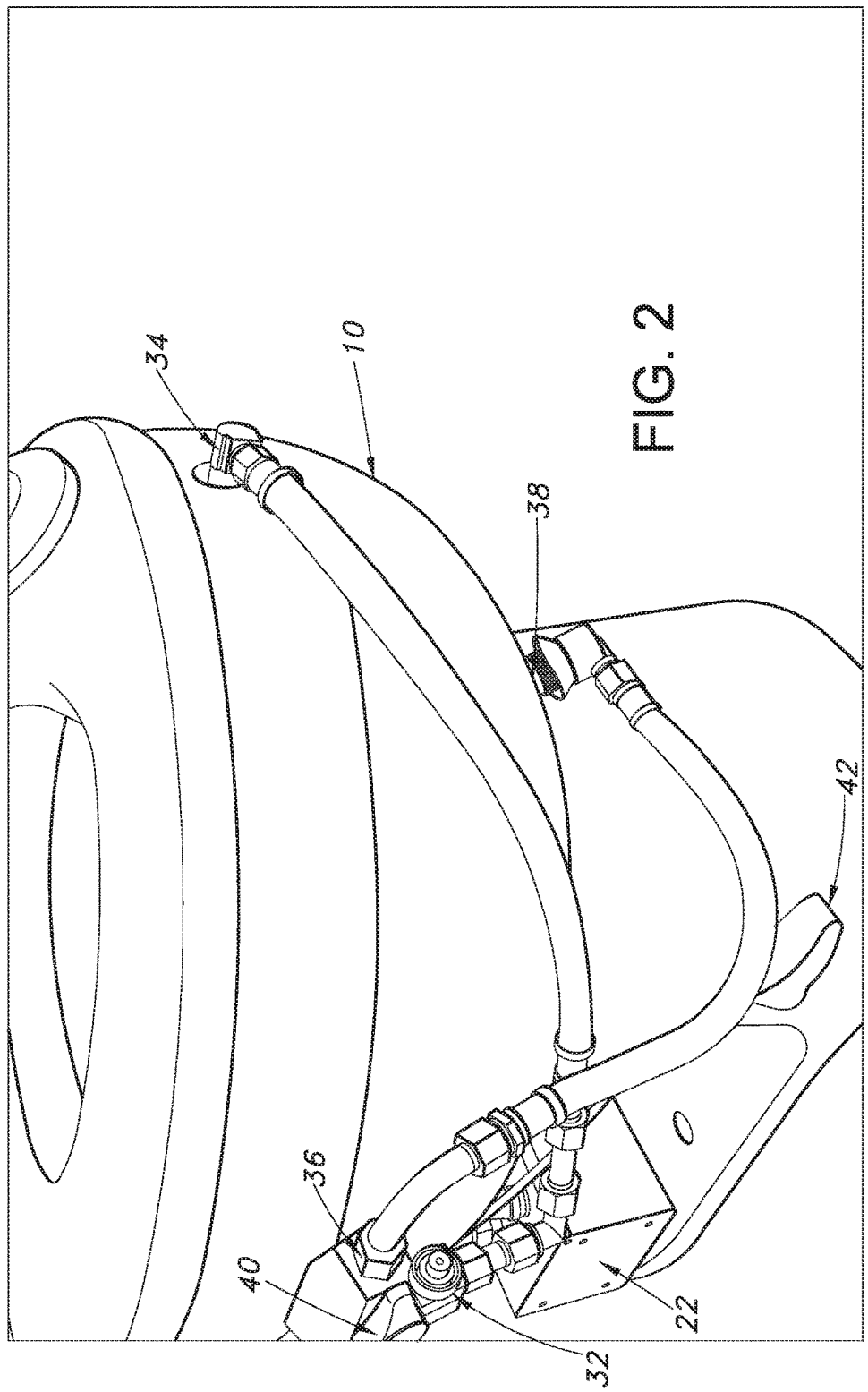
FIG. 2 is a front perspective view of the hygienic toilet shown in FIG. 1.
Figure 3:
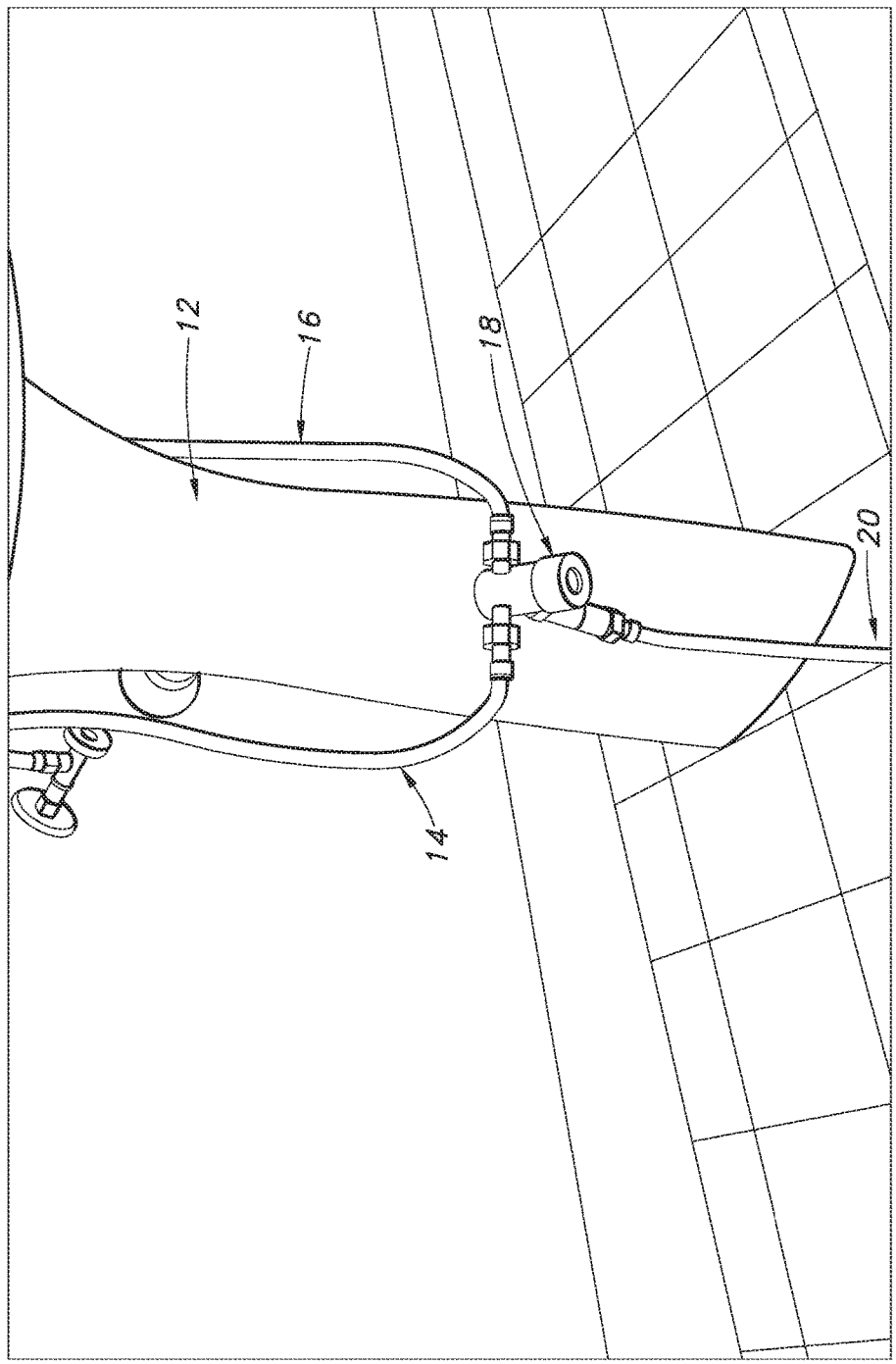
FIG. 3 illustrates the water source for input into the hygienic toilet shown in FIGS. 1 and 2.

As shown in FIGS. 1-3, the hygienic toilet 10 is designed to be a single unit which provides standard toilet features as well as hygiene features such as a means for washing and a means for drying subsequent to washing. To effect the washing feature, the hygienic toilet includes a water source, preferably a hot and cold water source from a nearby bathroom sink 12 as shown in FIG. 3. The hot water source 14 and cold water source 16 are in fluid communication with a thermostatic valve 18. The thermostatic valve 18 includes an input for the hot and cold water sources and a single output 20 of mixed water discharged at a predetermined temperature. For purposes of the washing feature of the present invention, the predetermined water temperature is preferably between about 25° C. and 45° C., and most preferably about 40° C.

Figure 4:
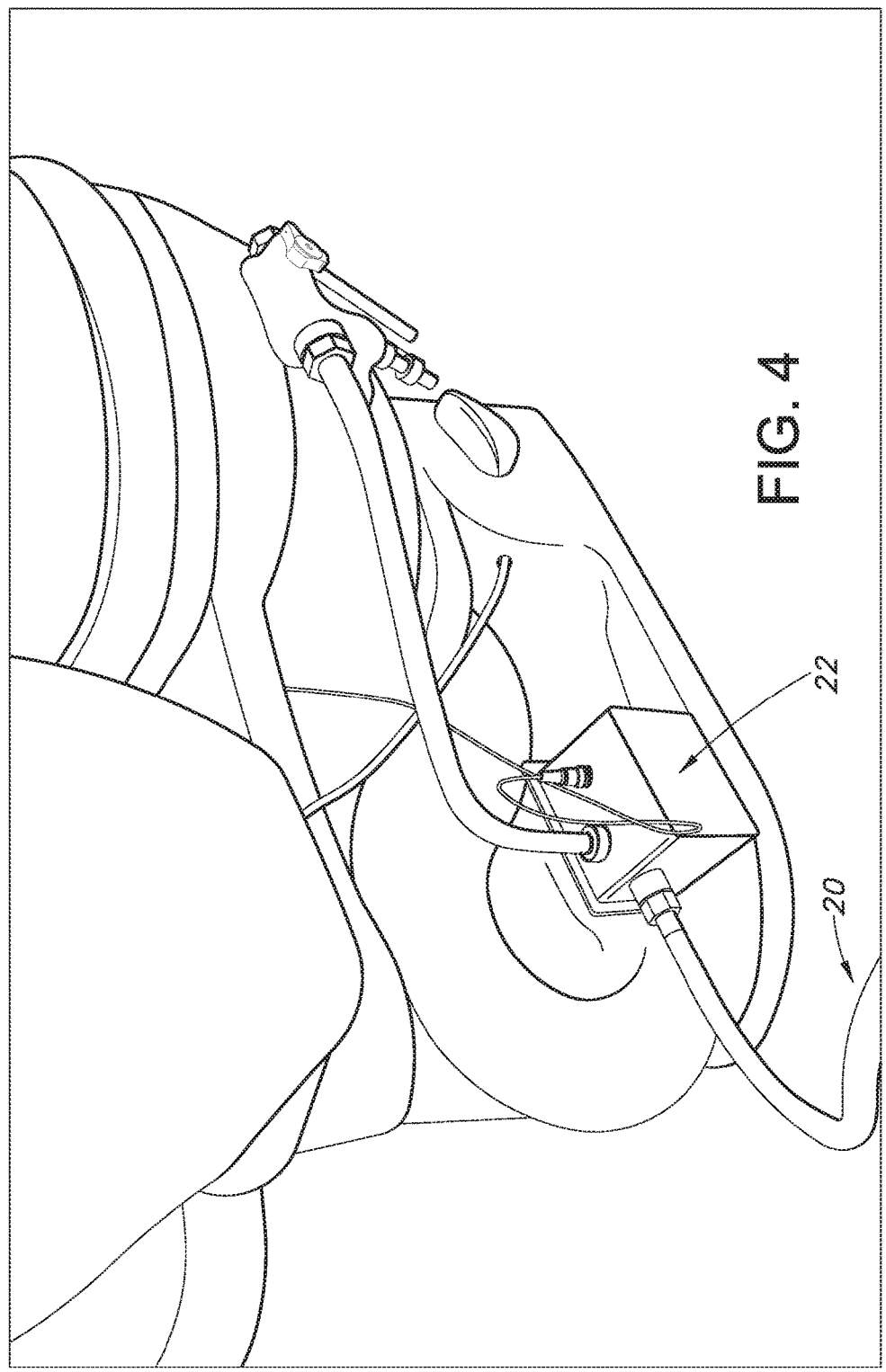
FIG. 4 is a rear perspective view of the hygienic toilet shown in FIG. 1.

The output 20 from the thermostatic valve 18 is input into a proximity sensing control valve 22 (FIG. 4). The control valve 22 preferably includes a sensor, typically an infrared sensor 24 (see FIGS. 7 and 8), which provides an input signal to the control valve 22. In a preferred embodiment, the hygienic toilet includes a lid 23 (FIG. 9) movable between a closed position and an open position. With the lid in the open position, the infrared sensor 24 (FIG. 7) sends a signal via cable 26 to the control valve to open valve and allow water to flow through the control valve 22. The proximity sensing control valve is well known to those skilled in the art and are commonly used, for example, with respect to automatic faucets which sense hands being placed under the faucet. The control valve 22 is typically battery operated, although a constant power source may also be provided.

Figure 11:
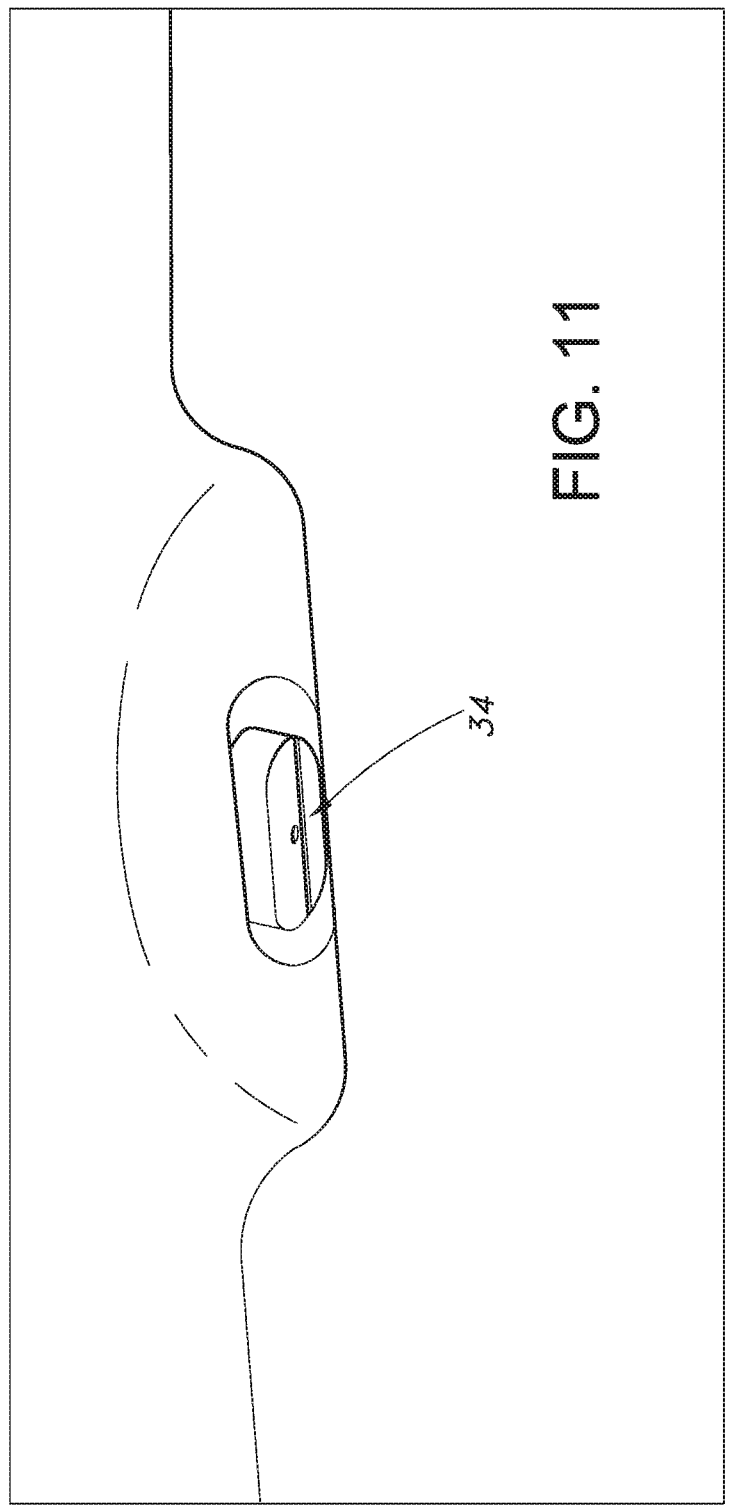
FIG. 11 illustrates the cleaning nozzle viewed from inside the bowl portion of the hygienic toilet shown in FIG. 1.
Figure 12:
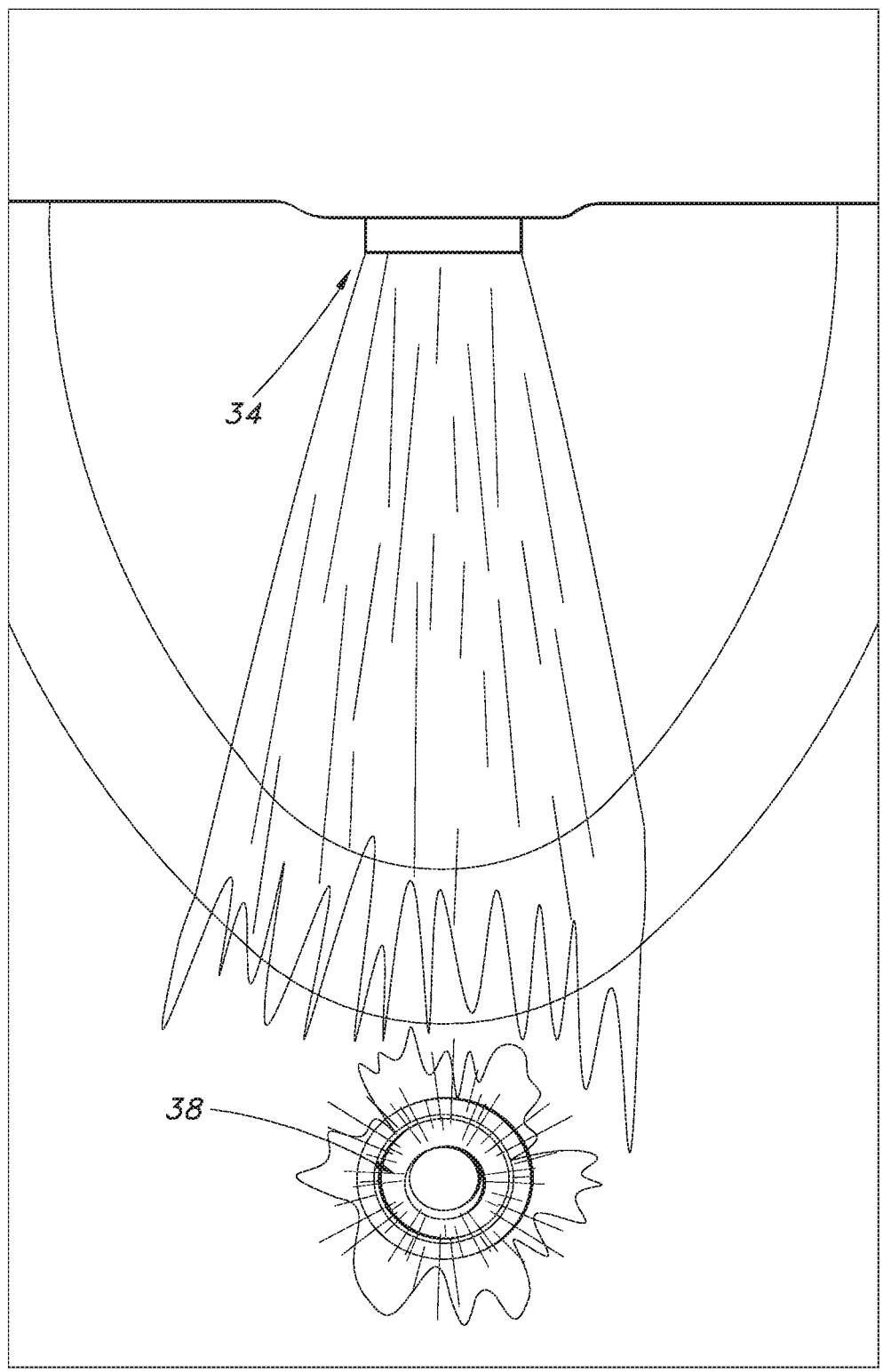
FIG. 12 illustrates the alignment of the cleaning nozzle and washing nozzle inside the bowl portion of the hygienic toilet shown in FIG. 1.

The output 28 from the control valve 22 is input into a manifold 30 having two outlets. As shown in FIGS. 1 and 2, the first outlet 32 is in fluid communication with a cleaning nozzle 34 located below the front rim of the toilet bowl. Thus, when the lid is opened, water is provided to the cleaning nozzle 34 (FIG. 11) to produce a broad, steady stream of clean water from the cleaning nozzle along the front end of the toilet bowl, which can be referred to as a "water curtain." The water stream from the cleaning nozzle 34 provides at least two functions. First, by adding water to the toilet bowl, a steady discharge of water from the bowl is provided to exchange the water and waste in the toilet bowl with fresh water. Second, the steady stream of clean water (i.e., water curtain) is directed to flow over the washing nozzle 38 to keep the washing nozzle clean and free from any debris. As shown in FIG. 12, the cleaning nozzle 34 is substantially aligned with the washing nozzle 38 so that water discharged from the cleaning nozzle 34 flows substantially directly over the washing nozzle 38.

As shown in FIGS. 1 and 2, a second outlet 36 of the manifold 30 is in fluid communication with the washing nozzle 38. The flow of water from the manifold 30 to the washing nozzle 38 is controlled by a proportional control valve 40. Preferably, control valve 40 is adjustable by the user. The proportional control valve 40 can be placed in closed position in which water is not permitted to flow to the washing nozzle 38. As the control valve 40 is opened, water flows to the washing nozzle 38 at a volume determined by the proportional control valve. The washing nozzle 38 includes an output of water which sprays the user seated on the hygienic toilet to wash the user. Based upon the setting of the proportional control valve and type of washing nozzle provided, a spray of water is released for washing at between about 5 psi to about 50 psi, typically about 35 psi, which pressure may be controlled by the user. In a preferred embodiment, the washing nozzle 38 outputs a spray in the shape of a cone to thoroughly wash the entire exposed area of the user within the hygienic toilet. As shown in FIGS. 1 and 2, the washing nozzle 38 extends into the front inside portion of the toilet bowl, below and in substantial alignment with the cleaning nozzle 34. Preferably, the washing nozzle 38 is oriented to be directed to form a spray at about a 45° degree angle to the horizontal surface of the floor and aimed towards the center of the seat opening to thoroughly wash the user.

In addition to adjustable water pressure, further refinements could also include, for example, temperature control, and directional spray control. These features can be controlled by the proportional control valve 40, or additional control valves or buttons, and/or by remote control.

Preferably, the proportional control valve 40 is set so that a slight steady stream of water is continuously flowing once the lid of the toilet is opened, thereby allowing the washing nozzle 38 to self-clean, and, preferably, to allow time for the water to reach a desired temperature. Thus, upon opening the control valve 40, warm water at a predetermined temperature is directed out of the washing nozzle. Such a steady stream of water also contributes to the exchange of water and waste in the bowl with fresh water.

As shown in FIG. 1, the hygienic toilet 10 also includes a standard flush feature by activating flush handle 42 provided on a lower front side of the toilet base. Flush handle 42 is coupled to the standard flushing mechanism in the tank via cable 44. The placement of the flush handle 42 enables the user to remain seated when flushing. Alternatively, the flush handle may be provided on a surface of the tank as is common on standard toilets.

As will be appreciated by those skilled in the art, the tubing associated with the cleaning nozzle and washing nozzle may be provided within an interior space and hidden from view to create a smooth appearance for the hygienic toilet. Typically, only the control valve 40, flush handle 42, and access to the proximity control valve 22 to change the battery are visible on the outside of the hygienic toilet 10.

Figure 5:
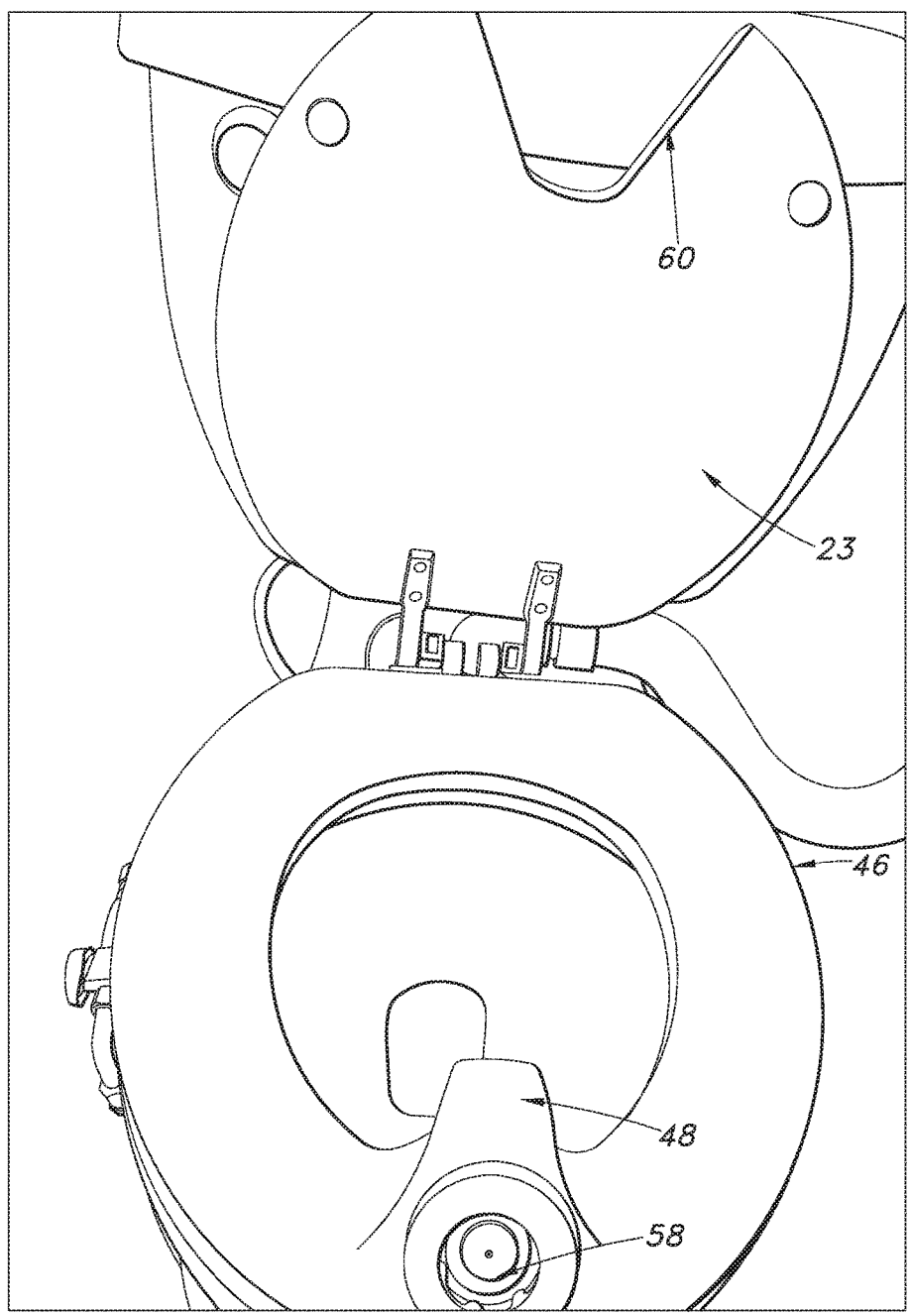
FIG. 5 is a top view of the hygienic toilet shown in FIG. 1 with the lid in the open position.
Figure 6:
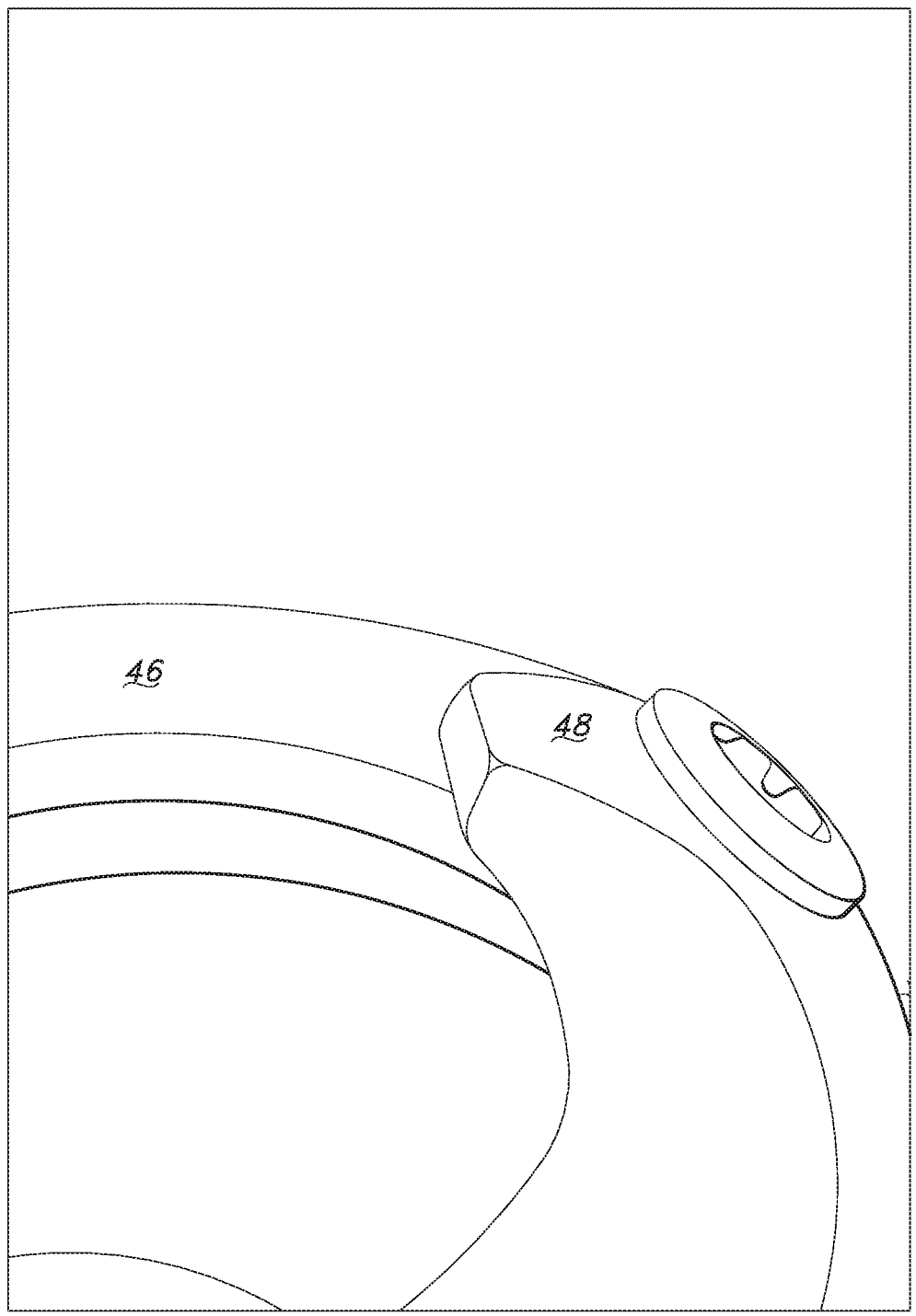
FIG. 6 is an enlarged side view of the horn-shaped member forming a portion of the contoured seat of the hygienic toilet shown in FIG. 1.
Figure 10:
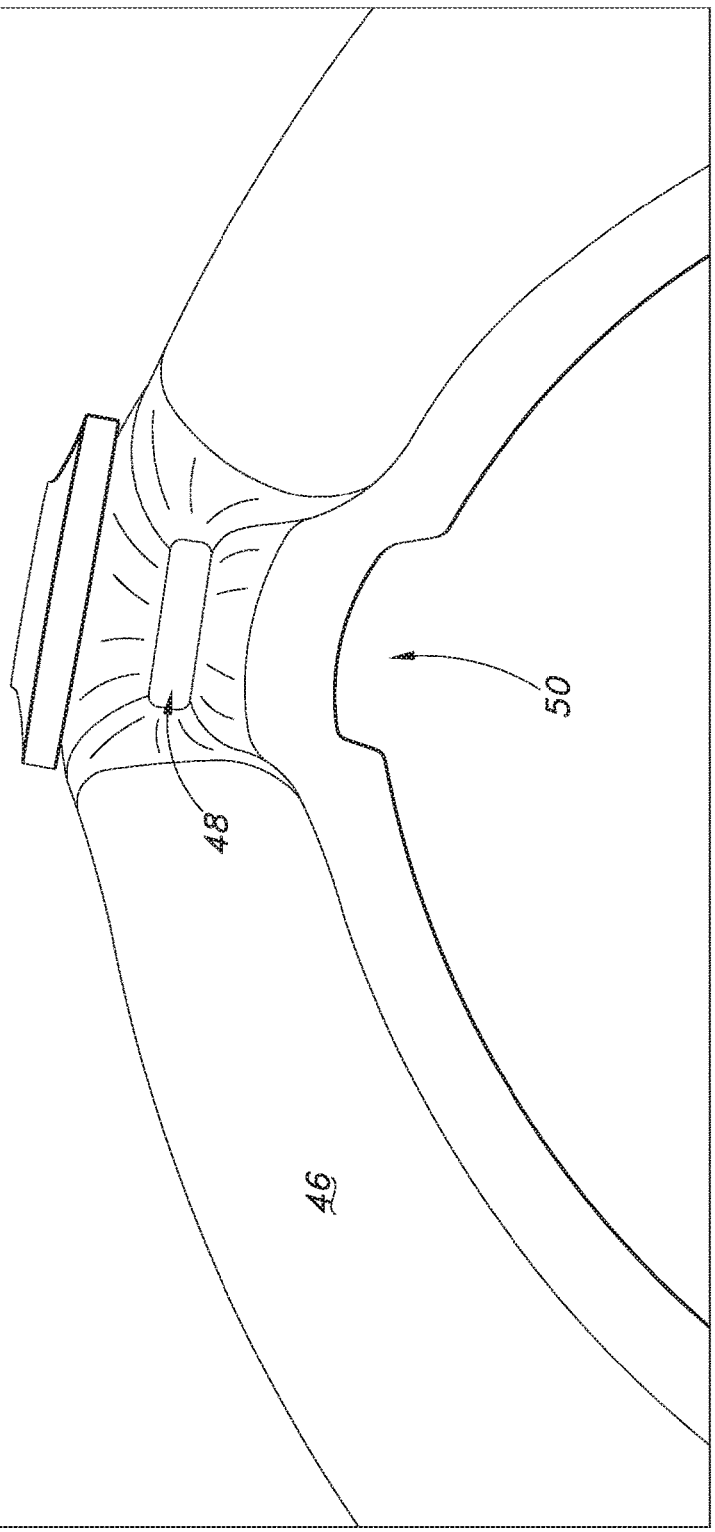
FIG. 10 is a top view of the horn-shaped member shown in FIG. 6.

A further feature of the hygienic toilet 10 is a uniquely contoured seat. In a preferred embodiment, the seat and toilet bowl portion are integrally formed together. As shown in FIGS. 5 and 6, the uniquely contoured seat 46 includes a substantially circular or elliptical opening similar to a standard toilet seat. However, unlike a standard seat, the seat 46 of the present invention includes a horn-shaped member 48 which extends upwards from a front, middle section of the seat 46. In particular, the horn-shaped member extends upward from the seat and includes curved sides which transition into the toilet seat upper surface. The horn-shaped member 48 is somewhat similar in shape and appearance to a saddle horn. Upon seating on the toilet seat, the pubic bone and groin area of the user is in direct contact with the horn shaped member 48, thereby substantially sealing the environment of the bowl. Thus, the horn-shaped member 48 contour means is designed to provide a substantially water-tight and air tight seal between the seated user and the toilet seat 46. The horn-shaped member 48 is designed to engage the user above the genitals and around the groin area to prevent and/or inhibit water from exiting the bowl portion when using the washing feature to wash the user. As shown in FIG. 10, the horn-shaped member 48 includes a recessed opening 50 on a bottom side thereof to accommodate male genitals. The seat can be provided in different sizes to thereby ensure a substantially sealed environment.

Figure 7:
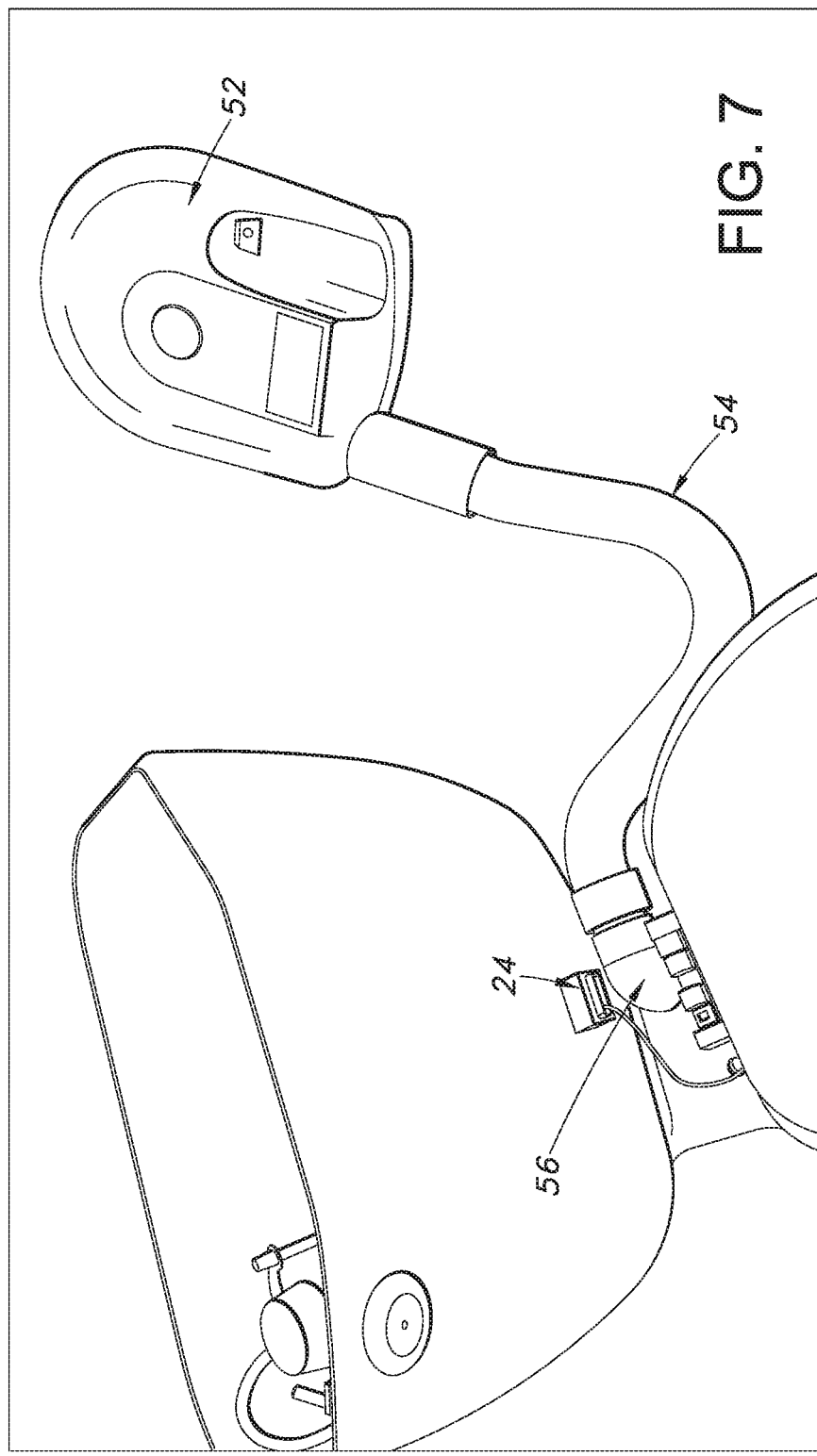
FIG. 7 is a top view of the hygienic toilet shown in FIG. 1 and further illustrates the source of heated air for the drying function.
Figure 8:
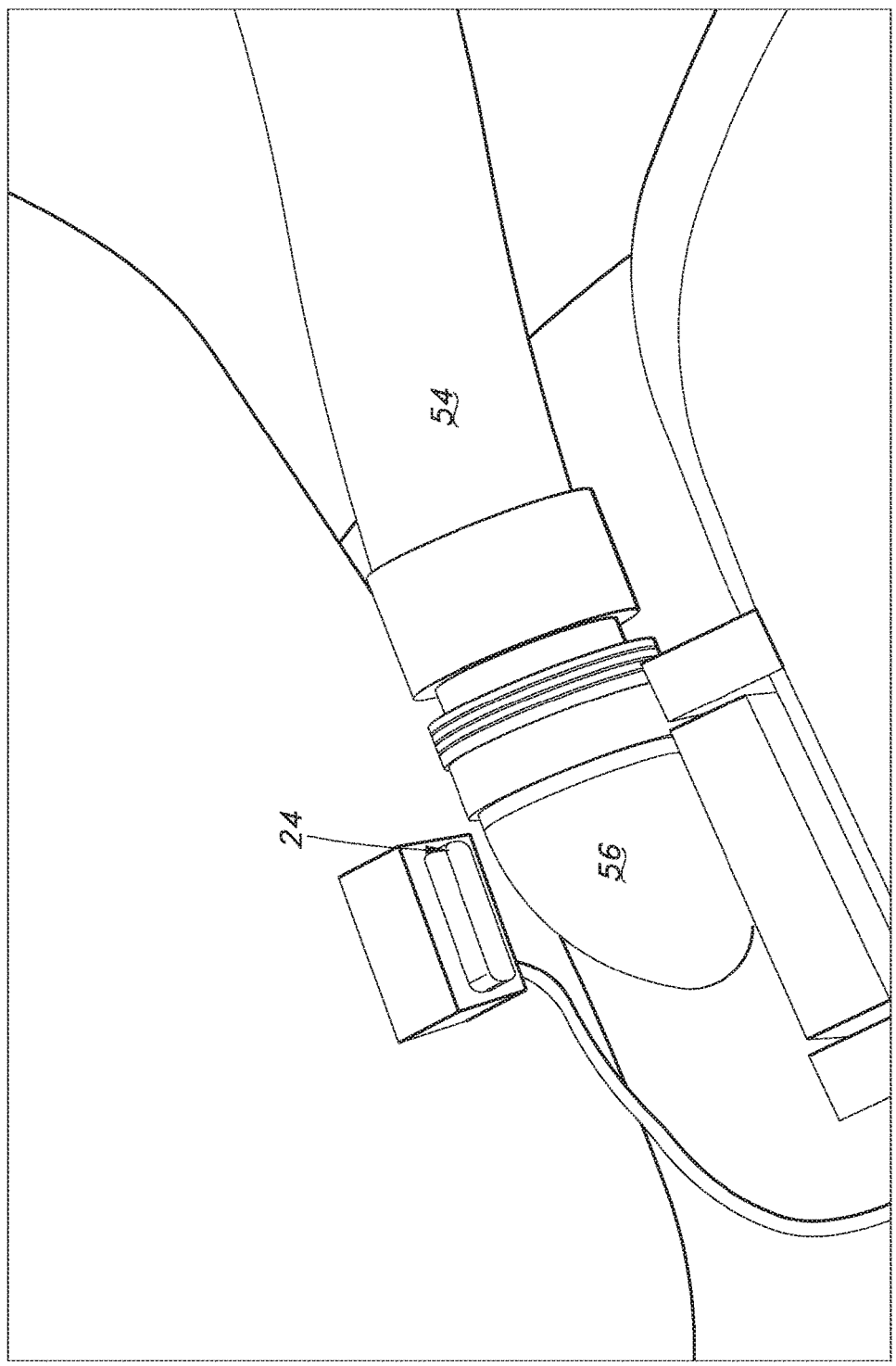
FIG. 8 is an enlarged view of the heated air hose attachment and sensor provided on a rear portion of the hygienic toilet.
Figure 13:
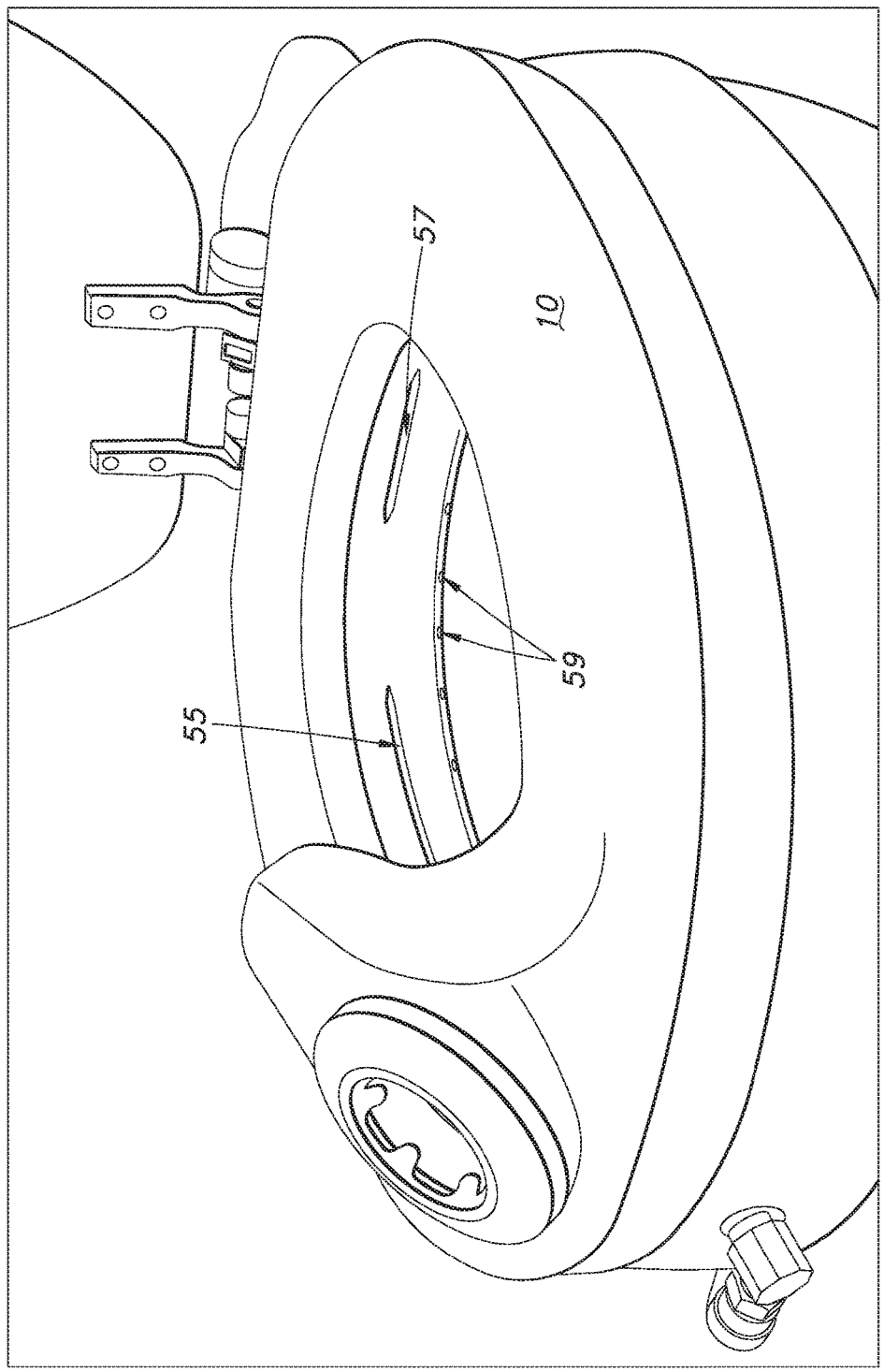
FIG. 13 illustrates the arrangement of the vent openings for the drying means.
Figure 14:
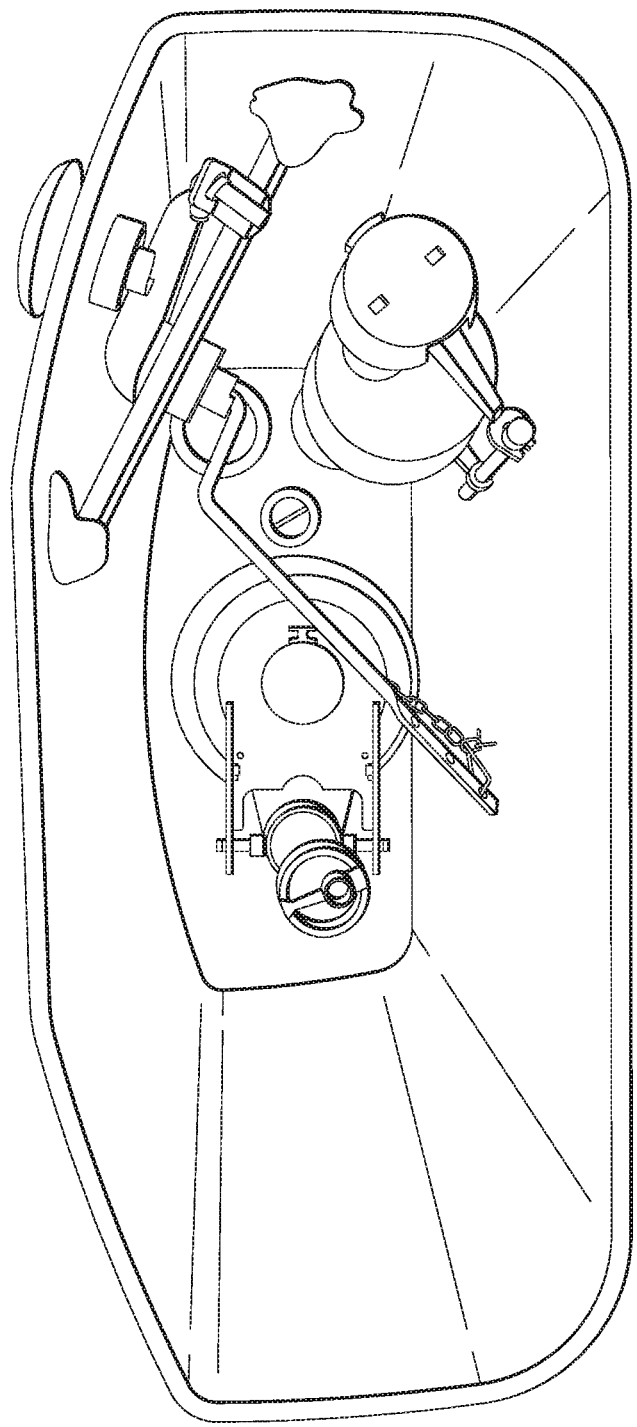
FIG. 14 illustrates the inside the tank portion of the hygienic toilet shown in FIG. 1.

A further feature of the hygienic toilet formed in accordance with the present invention is the ability to dry the user subsequent to washing for a substantially hands-free process. The drying means for the hygienic toilet preferably includes a means for generating and blowing air, preferably heated air. An example of a drying means is a wall mounted unit 52 which outputs warm air (FIG. 7). The source of the air is preferably coupled to the hygienic toilet 10 via a flexible hose 54 coupled to an air input 56. The air input is in fluid communication with a plurality of vents located under the rim of the toilet bowl. Any number, size and location of vents may be used. As shown in FIG. 13, preferably, at least two elongated rectangular vents 55 are provided on opposed sides of the toilet bowl. The opposed vents are positioned so that the two air flows are directed to collide and move upwards towards the seated user. The upward moment of the air flow is aided by the sealed environment of the bowl. Preferably, a third vent 57 is provided at rear portion of the toilet bowl to provide enhanced drying. The third vent is typically directed to allow air flow at about a 45° angle to the horizontal surface of the floor.

Figure 9:
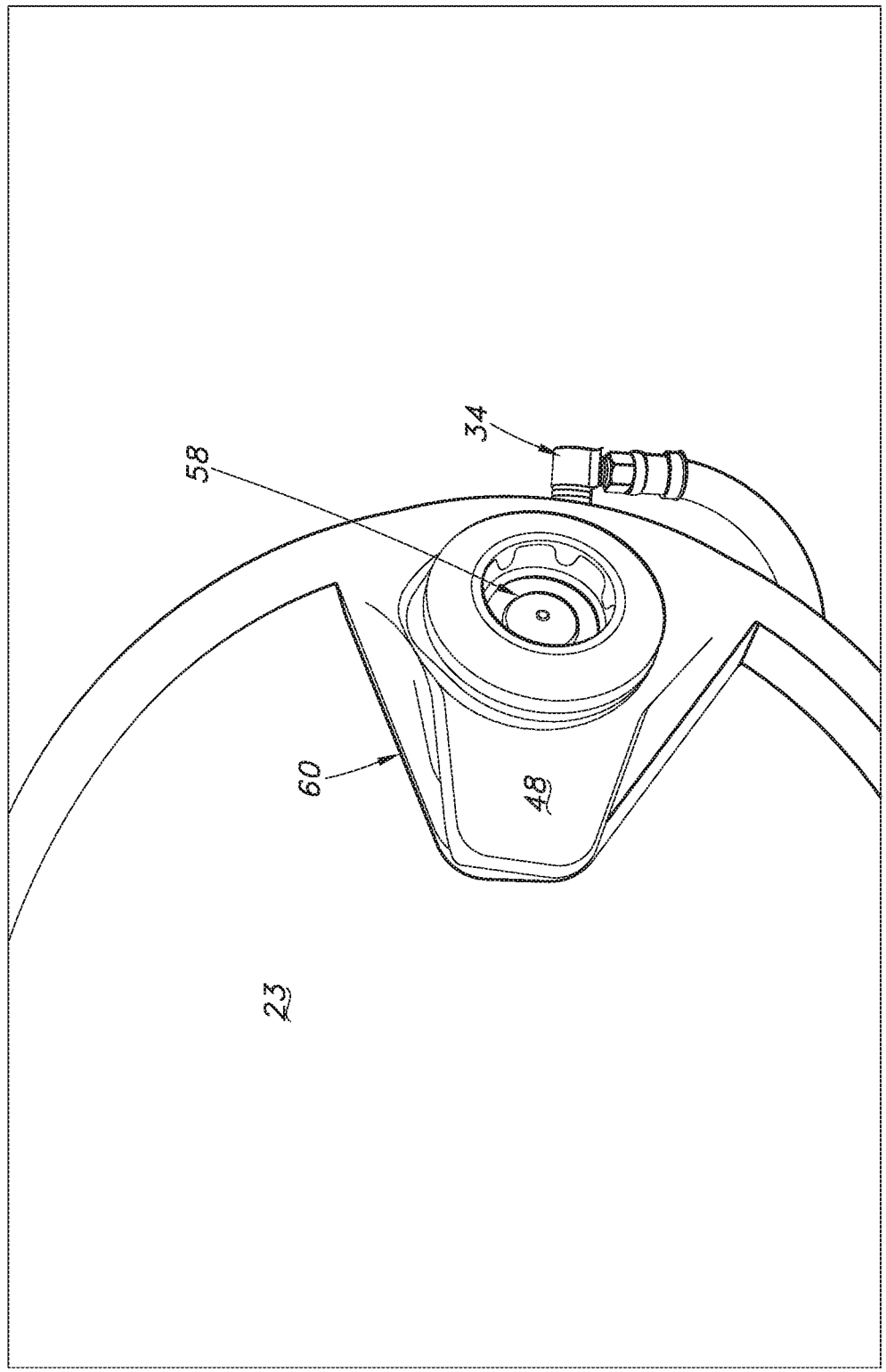
FIG. 9 is a top view of the hygienic toilet shown in FIG. 1 with the lid in the closed position.

Each vent 55, 57 may preferably be between about 2 mm to about 4 mm in height, and most preferably about 3 mm, and preferably between about 2 inches to about 5 inches in length, and most preferably about 4 inches in length. The distance between each side vent 55 and the rear vent 57 is from about 3 to 5 inches, preferably about 4 inches. The drying air is expelled through the vents, and optionally, a very small amount of air is also expelled through the flush openings 59 provided below the rim of the seat. Since the seated user and contoured seat do not allow the drying air to escape, the hygienic toilet preferably includes an air escape valve means to allow the air to be vented from the toilet bowl. As shown in FIGS. 5 and 9, the escape valve means preferably includes a flapper valve 58 positioned on the base of the horn-shaped member 48. It will be appreciated that any type of valve means may be provided. The flapper valve 58 allows heated air to escape upon reaching a certain pressure but provides a water-tight seal when using the cleaning function of the hygienic toilet.

By releasing the drying air from the toilet bowl portion, the flapper valve 58 functions to maintain a substantially constant temperature in the bowl when drying. The flapper valve 58 also allows humid air to leave the bowl while further air is expelled into the toilet bowl portion from the vents. The escape valve means size and form is selected to optimize air flow for purposes of drying the user.

The source of the air, typically heated air, may include a remote control for activating the source; or the source may be closely mounted to the hygienic toilet for direct control by the user. Once the air supply is turned off, the user has been washed and dried hygienically completely hands free.

As noted above, the drying means air vents are in fluid communication with the flush openings to permit air flow through all the openings within the toilet bowl. By being in fluid communication, the air vents also allow clean flushing water to be discharged through the vents during a standard flushing process. Thus, the air vents are flushed with clean water to keep them clean and free from debris.

As shown in FIGS. 5 and 9, the hygienic toilet 10 preferably includes a lid 23 movable between a closed position (FIG. 9) to an open position (FIG. 5). To accommodate the horn-shaped member 48, the lid includes a cut-out portion 60 which surrounds the horn-shaped member 48 when in the closed position.

Preferably, the tank of the hygienic toilet differs from standard toilet tanks in that there is no connection needed between the fill valve and the overflow tube; that is, there is no refill tube which would allow the overflow tube to refill the bowl. Instead the bowl is sufficiently refilled by the water curtain, and optionally by the washing nozzle. Such feature allows for water conservation.

A description of a typical manner by which to use the hygienic toilet 10 of the present invention follows. When the lid 23 is in its closed position, no water is flowing. Lifting of the lid activates the sensor 24 which provides an input signal to the proximity sensing control valve 22. Upon activation of the sensor, water starts to flow from the cleaning nozzle 34 to provide a "water curtain" which delivers a flow of clean water into the toilet bowl for continuous exchange of water therein, and to maintain the washing nozzle 38 clean and free from debris. Preferably, upon activation of the sensor, a small amount of water also starts to flow from the washing nozzle 38 for the purpose of self-cleaning the washing nozzle, and, also to allow for the mixing of hot and cold washing water to reach a predetermined temperature. Upon sitting on the contoured seat 46, the user essentially provides a water-tight and air-tight environment in the bowl. The user then relieves himself/herself.

Without standing up, the user then engages the proportional control valve 40 to adjust the washing nozzle 38 to a selected pressure to allow for washing of the private parts, including the genitalia, perineum, buttocks and anal area. Alternatively, before engaging the proportional control valve 40 (and before standing up), the user may optionally flush the toilet by the flush handle 42. However, flushing is typically not necessary for liquid waste since the continuous water exchange provided by the water curtain, and optionally, by the washing nozzle, may be sufficient to remove waste. Such feature allows for water conservation.

Once washing is sufficiently complete, the user may engage the drying means of the toilet, typically activated by a remote control means.

Accordingly, the present invention overcomes the disadvantages of prior art toilets and bidets to allow a completely hands free washing and drying process for the user of the hygienic toilet. No toilet paper is necessary to achieve sufficient cleanliness. Such a hands free experience is particularly valuable for elderly or disabled users, and their aides, at home or institutional settings, in maintaining hygiene.

The single unit hygienic toilet of the present invention is both easy to install, space-saving and economical. The hygienic toilet may be designed in a variety of sizes and colors and component parts may be replaced by any part suitable to accomplish the disclosed functions.

Optionally, the hygienic toilet can comprise wireless remote controls, heated seats, illumination through built in night lights, built in deodorizers and activated carbon filters to remove odors, and combinations thereof.

With respect to the above description, it is to be realized that the optimum dimensional relationships for the parts of the invention, to include variations in size, materials, shape, form, function and manner of operation, assembly and use, are deemed readily apparent to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A hygienic toilet comprising:
   a thermostatic valve having at least one input for a source of hot and cold water and having a single output configured to deliver water at a predetermined temperature;
   a manifold having an input for receiving the water output from the thermostatic valve, the manifold comprising a first water outlet controlled by a proportional control valve and a second water outlet;
   a washing nozzle in fluid communication with the first water outlet, and having a proportional control valve associated therewith to control the flow of water output from the washing nozzle;
   a cleaning nozzle in fluid communication with the second water outlet for providing a water curtain within an interior of the toilet; wherein the water curtain flows over the washing nozzle, and
   a drying means for drying water on a user, wherein the drying means comprises a means for generating and blowing heated air into an inlet provided at a rear portion of the toilet, the inlet being in fluid communication with a plurality of drying vent openings provided within bowl portion of the toilet,
   wherein the toilet includes a rim having flushing openings under the rim, and wherein, upon flushing the toilet, flushing water flows through both the flushing openings and the drying vent openings thereby keeping the drying vent openings clean from debris.

2. A hygienic toilet as defined in claim 1, wherein the plurality of drying vent openings comprises first and second vents arranged at opposite side portions within the bowl portion of the toilet such that air expelled through the first and second vents is directed to collide to provide an upward air flow directed out of the bowl portion of the toilet, and a third vent located at a rear end of the bowl portion.

3. A hygienic toilet as defined in claim 2, wherein the first, second and third vents each comprise an elongated rectangular vent opening.

4. The hygienic toilet of claim 2, wherein the first and second vents are between about 2 mm to about 4 mm in height and about 2 inches to about 5 inches in length.

5. A hygienic toilet as defined in claim 1, further comprising a proximity sensing control valve positioned between the thermostatic valve and the manifold, the proximity sensing control valve comprising a proximity sensor mounted on a rear portion of the toilet to sense the position of a lid being in an open or closed position, wherein when the lid is in the open position, the proximity sensing control valve opens to allow water to flow to the manifold.

6. A hygienic toilet as defined in claim 5, wherein the proximity sensor is an infrared sensor.

7. A hygienic toilet as defined in claim 5, wherein the proximity sensing control valve is battery operated.

8. A hygienic toilet as defined in claim 1, wherein the washing nozzle provides a spray of water at between about 10 psi to about 50 psi via adjustment of the proportional control valve.

9. A hygienic toilet as defined in claim 1, wherein the toilet comprises a base, wherein the upper portion of the base comprises the toilet seat, the toilet seat including a contour means for providing a water-tight seal between a user and the toilet seat, wherein the seat and the bowl portion are integrally formed together.

10. A hygienic toilet as defined in claim 9, wherein the contour means comprises a substantially circular or elliptical shaped opening and a front portion having an upwardly extending horn-shaped member having curved contoured sides which transition into the toilet seat upper surface, wherein the horn-shaped member engages the user above the genitals and around the groin area to prevent water from exiting the bowl portion when using the washing nozzle water spray.

11. A hygienic toilet as defined in claim 10, further comprising an air escape valve to allow drying air to escape the bowl-portion when using the drying means.

12. A hygienic toilet as defined in claim 11, wherein the air escape valve is a flapper valve located in the horn-shaped member.

13. A hygienic toilet as defined in claim 10, further comprising a toilet lid having an opening to fit the horn-shaped member therearound.

14. The hygienic toilet as defined in claim 1, wherein the predetermined temperature is between about 25° C. and 40° C.

15. The hygienic toilet of claim 1, wherein the washing nozzle is mounted in the front inside portion of a toilet bowl for spraying washing water from the source of water onto a user seated on the hygienic toilet, wherein the washing nozzle sprays a user from the front, wherein the washing nozzle is oriented to be directed to form a spray at about a 45° angle relative to the horizontal surface of the floor.

16. A hygienic toilet comprising:
at least one input for a source of water;
a washing nozzle in fluid communication with an output of the source of water, the washing nozzle being mounted in the front inside portion of a toilet bowl for spraying washing water from the source of water onto a user seated on the hygienic toilet, wherein the washing nozzle sprays a user from the front, wherein the washing nozzle is oriented to be directed to form a spray at about a 45° angle relative to the horizontal surface of the floor;
a drying means for drying water on a user; and
a flapper valve to allow drying air to escape bowl portion of the toilet when using the drying means,
wherein the hygienic toilet comprises a base, the upper portion of the base comprises a toilet seating surface integrally formed with the base and having a contour means for providing a substantially water-tight seal between a user and the toilet seating surface when water is sprayed from the washing nozzle.

17. A hygienic toilet as defined in claim 16, wherein the contour means comprises a substantially circular or elliptical shaped opening and a front portion having an upwardly extending horn-shaped member having curved contoured sides which transition into the toilet seat upper surface, wherein the horn-shaped member engages the user above the genitals and around the groin area to prevent water from exiting the bowl portion when using the washing nozzle water spray.

18. A hygienic toilet comprising:
a base, wherein the upper portion of the base comprises the toilet seat, the toilet seat including a contour means for providing a water-tight seal between a user and the toilet seat, wherein the contour means comprises a substantially circular or elliptical shaped opening and a front portion having an upwardly extending horn-shaped member having curved contoured sides which transition into the toilet seat upper surface, wherein the horn-shaped member engages the user above the genitals and around the groin area to prevent water from exiting the bowl portion when using the washing nozzle water spray;
a thermostatic valve having at least one input for a source of hot and cold water and having a single output configured to deliver water at a predetermined temperature;
a manifold having an input for receiving the water output from the thermostatic valve, the manifold comprising a first water outlet controlled by a proportional control valve and a second water outlet;
a washing nozzle in fluid communication with the first water outlet, and having a proportional control valve associated therewith to control the flow of water output from the washing nozzle;
a cleaning nozzle in fluid communication with the second water outlet for providing a water curtain within an interior of the toilet; wherein the water curtain flows over the washing nozzle, and
a toilet lid having an opening to fit the horn-shaped member therearound.

19. A hygienic toilet comprising:
a thermostatic valve having at least one input for a source of hot and cold water and having a single output configured to deliver water at a predetermined temperature;
a manifold having an input for receiving the water output from the thermostatic valve, the manifold comprising a first water outlet controlled by a proportional control valve and a second water outlet;
a washing nozzle in fluid communication with the first water outlet, and having a proportional control valve associated therewith to control the flow of water output from the washing nozzle;
a cleaning nozzle in fluid communication with the second water outlet for providing a water curtain within an interior of the toilet; wherein the water curtain flows over the washing nozzle;
a base, wherein the upper portion of the base comprises the toilet seat, the toilet seat including a contour means for providing a water-tight seal between a user and the toilet seat, wherein the contour means comprises a substantially circular or elliptical shaped opening and a front portion having an upwardly extending horn-shaped member having curved contoured sides which transition into the toilet seat upper surface, wherein the horn-shaped member engages the user above the genitals and around the groin area to prevent water from exiting the bowl portion when using the washing nozzle water spray;
a drying means for drying water on a user and wherein the horn-shaped member engages the user to prevent the drying air from exiting the bowl portion, and
a flapper valve to allow drying air to escape the bowl portion when using the drying means.

* * * * *